(12) United States Patent
Boss et al.

(10) Patent No.: US 7,330,103 B2
(45) Date of Patent: Feb. 12, 2008

(54) VEHICLE COLLISION AVOIDANCE SYSTEM ENHANCEMENT USING IN-CAR AIR BAG DEPLOYMENT SYSTEM

(75) Inventors: Gregory J. Boss, American Fork, UT (US); Rick A. Hamilton, II, Charlottesville, VA (US); James W. Seaman, Falls Church, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 11/186,532

(22) Filed: Jul. 21, 2005

(65) Prior Publication Data

US 2007/0018800 A1 Jan. 25, 2007

(51) Int. Cl.
*B60Q 1/00* (2006.01)
(52) U.S. Cl. .................. 340/435; 340/438; 340/903; 701/45; 180/271; 280/735
(58) Field of Classification Search .............. 340/435, 340/436, 438, 903, 479, 902, 904; 701/45, 701/301; 180/167, 271; 280/735
See application file for complete search history.

(56) References Cited

U.S. PATENT DOCUMENTS

| | | | |
|---|---|---|---|
| 4,626,850 A * | 12/1986 | Chey | ........................ 340/903 |
| 4,673,937 A | 6/1987 | Davis | |
| 5,920,281 A | 7/1999 | Grace | |
| 6,275,773 B1 | 8/2001 | Lemelson et al. | |
| 6,295,495 B1 * | 9/2001 | Morman et al. | ............. 701/45 |
| 6,335,682 B1 * | 1/2002 | Bates et al. | ................ 340/479 |
| 6,624,782 B2 | 9/2003 | Jocoy et al. | |
| 6,831,572 B2 * | 12/2004 | Strumolo et al. | .......... 340/903 |
| 6,851,504 B2 * | 2/2005 | Campbell et al. | ........... 180/271 |

FOREIGN PATENT DOCUMENTS

WO WO 98/00730 1/1998

OTHER PUBLICATIONS

Cheok et al.; "A Multisensor-Based Collision Avoidance System with Application to a Military HMMWV"; Intelligent Transporation Systems Conference Proceedings, Dearborn MI, Oct. 1-3, 2000; pp. 288-292.
Mimuro et al.; "Functions and Devices of Mitsubishi Active Safety ASV"; Proceedings of the 1996 IEEE Intelligent Vehicles Symposium, Tokyo, Japan, Sep. 19-20, 1996.

* cited by examiner

*Primary Examiner*—Anh V. La
(74) *Attorney, Agent, or Firm*—Whitham, Curtis, Christofferson & Cook, PC; William E. Schiesser

(57) ABSTRACT

Peer-to-peer communications between vehicles providing warning of a collision or near-collision event and/or collision avoidance is controlled by otherwise underutilized air bag deployment processors in respective vehicles. Direction of reception of warning signals is used to selectively control relaying of warning signals at differentiated warning levels, collision avoidance actions and/or in-vehicle warning alarms to operators of vehicles in the vicinity of an event.

15 Claims, 5 Drawing Sheets

| Warning Level | Message Received from Fore | Message Received from Aft, Left, or Right |
|---|---|---|
| 1 | (1) Emit audible buzzer, (2) depress brake pedal, and (3) retransmit level 1 signal as level 2 signal. | (1) Emit audible buzzer and (2) retransmit level 1 signal as level 2 signal. |
| 2 | (1) Emit audible buzzer, (2) depress brake pedal, and (3) retransmit level 2 signal as warning signal. | (1) Emit audible buzzer and (2) retransmit level 2 signal as warning signal. |
| Warning | (1) Emit audible buzzer. | (1) Emit audible buzzer. |

*Figure 4*

VEHICLE COLLISION AVOIDANCE SYSTEM ENHANCEMENT USING IN-CAR AIR BAG DEPLOYMENT SYSTEM

BACKGROUND OF THE INVENTION

1. Field of the Invention

The present invention generally relates to collision avoidance systems for vehicles and, more particularly, to enhancements for collision avoidance and warning systems employing in-car resources including air bag deployment systems.

2. Description of the Prior Art

The number of vehicles of all types which are in use is increasing rapidly at the present time. As a result, congestion of airways, waterways and, especially, roadways is also increasing and leading to increased rates and severity of collisions between vehicles. Further, the increase in numbers of vehicles on roadways is increasing more rapidly than it is economically possible to increase transportation infrastructure (e.g. roads, aids to air and water navigation, etc), leading to a need to use available routes, especially roadways, more efficiently and, often, at a higher population density of vehicles than can be safely accommodated by unassisted human operators of vehicles at the present state of the art.

Vehicle collisions are occurring with increasing frequency and severity, often caused by sudden slowing or stopping of traffic flow due to congestion or other collisions or accidents, possibly involving adverse weather conditions. Accidents caused by such conditions often involve multiple vehicles due to the inability of trailing drivers to comprehend and react to sudden changes in traffic conditions and vehicle speed. The injuries, fatalities and financial and economic repercussions are thus greatly and unnecessarily increased.

Accordingly, there has been much recent interest in providing increased protection for vehicle occupants such as energy-absorbing structures and air bags as well as systems which may assist in controlling the vehicle in response to detected conditions. However, systems directed to these very different purposes have necessarily been approached separately and with varying degrees of success.

There are several types of in-vehicle collision avoidance and warning system (IVCAWS) and collision avoidance systems (CAS) currently in use. These systems generally use radar or ultra-sonic emissions to detect vehicle distances, relative velocities and stoppages. Some of these systems also exploit the availability of global positioning systems (GPS) to determine the exact location of vehicles relative to each other to enhance automatic intervention. However, these latter systems are not in general use by the public due to the cost of implementing Such systems using conventional methods while the compromise of effectiveness is unavoidable without substantially universal use. Additionally the complexity of all currently known CAS systems, particularly GPS systems, is slowing industry and public adoption of such technology. Specifically, the use of radar and ultrasonic rear-end collision avoidance systems (RE-CAS) requires complex sensing equipment and sensing algorithms to predict when a rear end collision may occur or has occurred. The use of ultrasonic emissions to determine vehicle position relative to intersections is also known and, in combination with ground sensors, could provide enhanced collision avoidance protection. However, any CAS system which is not wholly contained within the vehicle, including use of GPS systems, must be included in the transportation infrastructure and carries substantial cost and delays in construction and implementation at a time when resources allocable to construction of transportation infrastructure are often scarce. Further, known CAS systems of all types, have limited effectiveness and operate under the relatively demanding constraint of having their effects limited to the vehicle in which they are installed.

In regard to protection of vehicle occupants, air bags have been the protection device of choice for well in excess of ten years and have been increasingly employed and later required in automobiles and some other vehicles. Initially, air bags were employed for only the driver and for front end impact but later extended to other passengers and other impact directions. While air bags were initially implemented with relatively crude mechanical devices, microprocessors are now currently used to provide for consideration of more input data, beyond an actual impact previously sensed, to determine when an air bag should be deployed.

Such microprocessors, at the present time, are capable of collecting and storing at least a brief history of deceleration characteristics of the vehicle as well as inputs from a speed sensor, gyroscopic sensors and collision sensors to avoid deploying an air bag when deployment is not needed, such as low speed collisions, intense braking of otherwise normal driving and the like. Current air bag deployment processors employ continuous sensor sampling with a storage window of a few milliseconds up to about fifty milliseconds or somewhat longer. If the air bag is actually deployed, the air bag processor is generally arranged to store sensor input for later analysis by law enforcement officials and insurance adjusters to determine the circumstances of the collision although the saved information for such a purpose is very limited. Nevertheless, while the air bag deployment system is wholly contained within the vehicle, at the current state of the art, it has no function in collision avoidance.

Some forms of signaling between vehicles are known and may vary greatly in complexity and functionality from well-known, simple and ubiquitous audible horns to radio communications. For Example, U.S. Pat. No. 6,275,733B1 to Lemelson et al. suggests using radio transmissions from one vehicle to indicate a warning to a driver of an adjacent vehicle or control internal and/or external warning signals or indicators and to signal to police. However, such systems are complex in regard to collision avoidance in the vehicle in which it is installed (this particular system utilizing a dedicated processor and supporting an auto-pilot mode in response to an expanded array of condition sensors of additional types not generally present on currently available vehicles) and do not support collision avoidance systems in other vehicles beyond a very rudimentary level of alerting drivers of adjacent and following vehicles of a dangerous condition and relying on the alerted drivers to take appropriate action.

SUMMARY OF THE INVENTION

It is therefore an object of the present invention to provide enhancements for collision avoidance systems without necessitating use of extravehicular resources, such as ground sensors, GPS or the like and which may be implemented at low cost by utilizing air bag deployment processors while providing signaling and control between vehicles.

It is a another object of the invention to provide enhancements of air bag deployment systems and improve collection of information which may be useful in analyzing an accident or collision.

It is a further object of the invention to provide the ability to communicate relative location specific information, including vehicle control information, to vehicles in front of, behind and to the right and left of a given vehicle which may be subject to or present dangerous conditions and to relay similar location specific information to yet further vehicles in a non-interfering, network-like fashion.

In order to accomplish these and other objects of the invention, an in-vehicle collision and warning system (IV-CAWS) is provided including a vehicle air bag collision protection system including sensors and a processor capable of discriminating a collision, near-collision or dangerous condition, a signalling arrangement for transmitting a warning or information signal upon detection of a collision, near-collision or dangerous condition, a receiver arrangement responsive to a received warning or information signal for providing a warning to an operator of the vehicle, relaying a warning or information signal, and/or controlling the vehicle for collision avoidance.

In accordance with another aspect of the invention, a method of in-vehicle collision avoidance and warning comprising steps of predicting an event in an originating vehicle using an air bag deployment processor, transmitting a warning signal to another vehicle, directionally receiving the warning signal at that vehicle, and selectively and directionally relaying the warning signal at a different warning level to other vehicles responsive to a direction of reception of said directionally receiving step.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a table representing preferred responses based on directionality and warning level of peer-to-peer communications in accordance with the invention.

DETAILED DESCRIPTION OF A PREFERRED EMBODIMENT OF THE INVENTION

Figure 1:
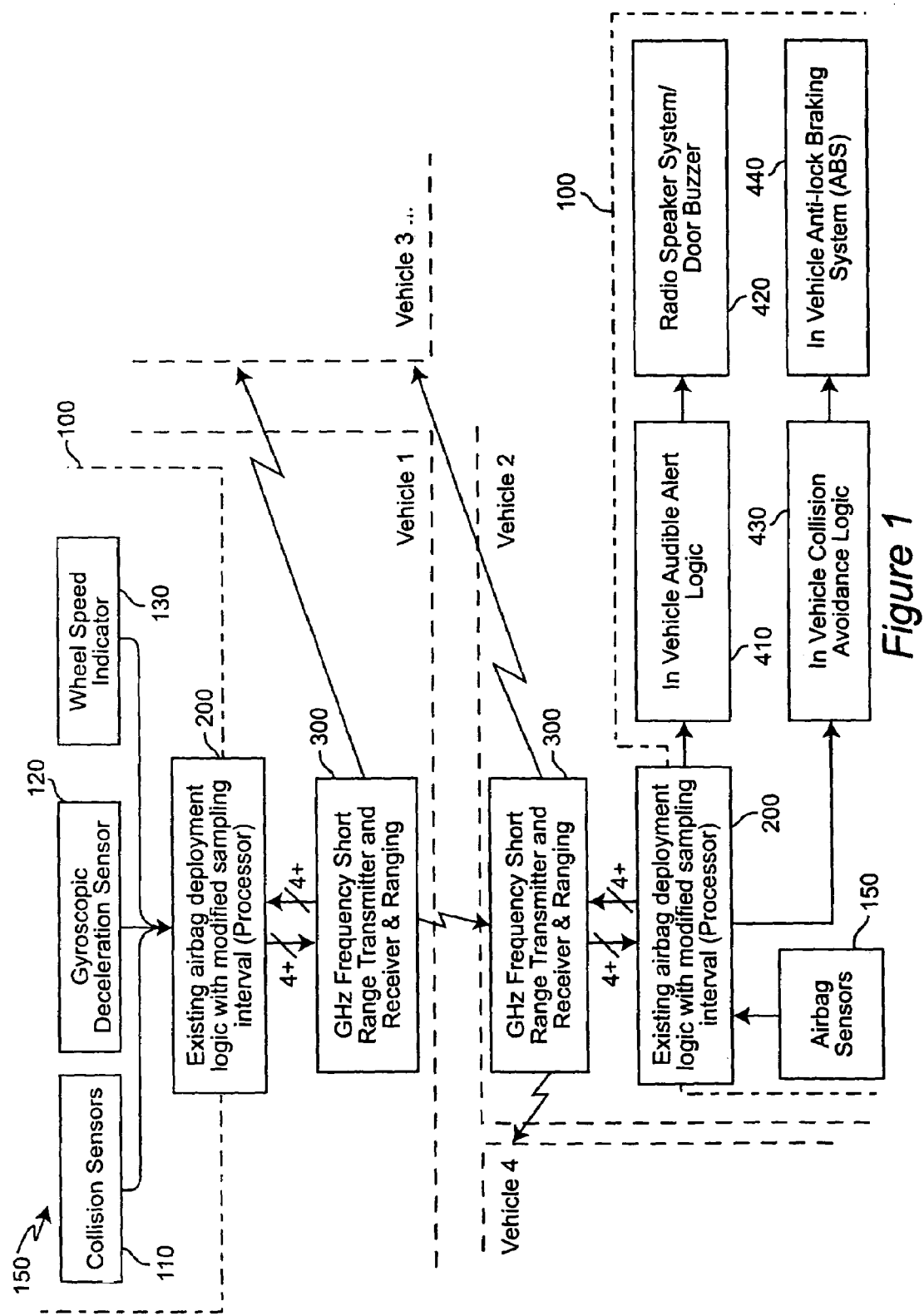
FIG. 1 is a schematic block diagram of an in-vehicle collision avoidance and warning system (IVCAWS) in accordance with the present invention.

Referring now to the drawings, and more particularly to FIG. 1, there is shown a high level block diagram of the in-vehicle collision avoidance and warning system (IV-CAWS) in accordance with the invention. As alluded to above, the effectiveness of any collision avoidance and warning system (CAWS) depends on communications between vehicles to provide early warning and/or to begin automatic vehicle control as early as possible. Communication between vehicles, in turn, depends on similarly equipping most, if not all, vehicles with CAWS systems which operate similarly and are compatible with each other. To achieve this latter condition, the invention exploits the capabilities of processors used to deploy air bags Which are already present in most vehicles. Therefore, the cost of providing the invention in a vehicle, as original equipment or by retrofitting, is very much reduced and may be limited to essentially the cost of radio transmitters and receivers and the provision of sufficient memory for that processor to expand the sampling period to about one second or, optionally, longer (and, as a perfecting feature of the invention, to provide for in-vehicle messages using voice synthesis and/or extra-vehicular (e.g. coded) messages for peer-to-peer transmission) if not already available in the air bag deployment system. The additional memory, if needed beyond original vehicle equipment, will also provide the additional benefit of vehicle condition recording immediately prior to any accident or collision. The remainder of the system in accordance with the invention may be implemented principally in software. Accordingly, the invention can be retrofit into existing air bag systems easily and economically to support near-universal employment of the invention to further support high levels of effectiveness. This important feature of the invention is particularly illustrated in FIG. 1. However, while some of the elements of FIG. 1 are indicated as "existing" it should be understood that no portion of FIG. 1 or any other Figure is admitted to be prior art.

By way of basic introduction, FIG. 1 is intended to illustrate several aspects of a preferred form of the invention which will be discussed in greater detail below. In particular, the invention preferably employs multiple, directional transmitters and receivers so that not only can a direction of reception be discriminated and different messages can be transmitted in particular directions and with transmitters having different ranges to better accommodate traffic scenarios. Conversely, the illustration of FIG. 1 is intended to indicate that the invention is preferably configured to operate among multiple vehicles which may be arrayed in any arbitrary spatial relationship to each other. Further, as will be evident from FIG. 1, different vehicles may be differently equipped and employ different combinations of elements in various implementations of the invention; the only required common feature being the signaling frequency. The system need not be confined to any specific wireless frequency or medium (e.g. radio, microwave, ultrasonic acoustic waves, etc.) by may, and preferably employ a plurality of frequencies and media. These applications of the invention to vehicles will be discussed in more detail below and many variations thereon will be evident to those skilled in the art.

However, as a matter of ease and economy of deployment of the system in accordance with the invention, FIG. 1 also indicates that a substantial portion of the hardware required is already available (and under-utilized) in many if not most vehicles in current use. Specifically chain lines 100 within the depictions of vehicles 1 and 2 delineate the hardware generally present in vehicles manufactured within the past few years. In regard to vehicle 1, while air bag deployment arrangements were initially, when introduced more than ten years ago, had comparatively very primitive sensors (e.g. mercury switches) and deployment systems, erroneous deployments have led to much more sophisticated deployment systems including sophisticated processing of data derived from a variety of sensors such as collision sensors 110, gyroscopic deceleration (and possibly other motion) sensors 120 and wheel speed indicators 130 and possibly others as inputs to processor 200 which determines whether or not an air bag (or which air bags of a plurality of air bags) should be deployed at any given time. More or fewer sensors of these or other types (such as for detecting sharp or sudden steering to the left or right or movement to the left or right not correlated with steering) may be deployed on a given vehicle and all such sensors are collectively illustrated at 150 of Vehicle 2. Similarly, recently manufactured vehicles will generally have some portion of the array of response systems generally indicated in regard to Vehicle 2 as an audible alert system 410 to provide audible alarm messages to the vehicle operator or possibly to other personnel or vehicles in the vicinity through a speaker system (e.g. by voice synthesis, warning tone(s) or the like), horn or buzzer or the like, collectively illustrated at 420. Some degree of automatic collision avoidance logic 430 may be provided and implemented through an anti-lock braking system and possibly other arrangements such as steering wheel shakers prompting or urging but not necessarily compelling or controlling a particular steering action on the part of the driver/operator.

Chain lines 100 in vehicles 1 and 2 are depicted as passing through the air bag deployment logic processors 200. As alluded to above, such processors are now generally provided but underutilized to provide an essentially binary decision as to whether or not an air bag should be deployed. It is an important feature of the invention that the hardware of the existing processor can generally be used with only software modification and, possibly, augmentation of memory to develop substantial and flexible CAWS functionality extending over a plurality of vehicles and which can be readily expanded as other technologies for collision avoidance become available.

It will be appreciated from the system architecture illustrated in FIG. 1 that the principal hardware required by the invention is transmitters and receivers 300 providing an additional input to and receiving control and/or message signals from processors 200. The receiver also preferably includes a signal strength measurement or other ranging arrangement to obtain a general indication of distance from the transmitter of the received signal as well as evaluation of whether or not the signal is received over a signal path which includes a reflection of the transmitted signal energy so that the response of the system to redundant/re-transmitted signals (e.g. received by reflection) can be avoided. It is also preferred to limit energy of transmitted signals to limit reflections and facilitate ranging at receivers with relatively simple signal strength or other signal reception parameter (e.g. signal to noise ratio) detection arrangements. It is also preferred to provide for directional transmission and reception of signals over at least four discrete channels oriented to the front/fore, rear/aft, left and right of each vehicle. The received signals can be considered as long range and/or extra-vehicular inputs in parallel with the on-board condition sensors 150 and are processed in combination therewith to determine not only corrective action to be taken and/or warnings to be issued but also additional signals to be transmitted and thus relayed to other vehicles for similar processing in those vehicles and which may evoke an entirely different response in such other vehicles.

Figure 1A:
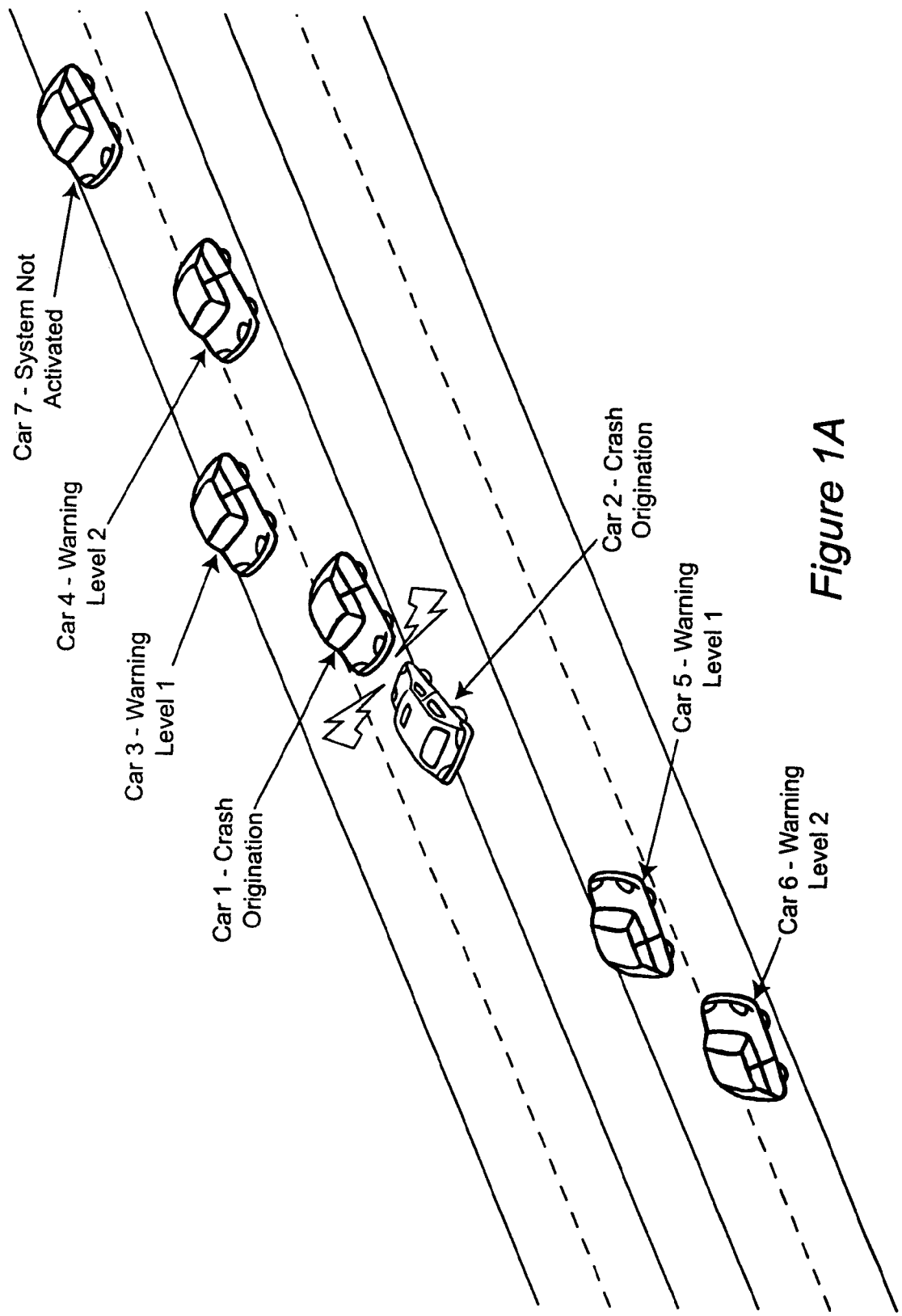
FIG. 1A illustrates an accident scenario and relay transmission of inter-vehicle communications.

For example, referring to FIG. 1A, assume a crash occurs between cars 1 and 2, the crash origination, and that the invention is provided in at least one of them. The in-vehicle collision and warning system (IVCAWS) of the present invention will transmit a crash signal prior to deployment of the air bag immediately prior to a collision. This signal will be received within the limited transmission range by car 3 and car 5 and read as a "level 1" transmission based on proximity (e.g. signal strength), the signal indicating crash origination, lack of secondary transmission or the like, or the detected nature of the crash or a combination thereof). The respective IVCAWS systems in car 3 and car 5 will do one or more of the following:

1.) Emit an audible buzzer/alarm,
2.) depress the brake pedal,
3.) retransmit the "level 1" signal as a "level 2" signal (which may reflect the particular stage of relay hierarchy and/or a lesser degree of proximity in terms of number of intervening vehicle and the originating vehicle) to other vehicles in, for example, a twenty-five yard radius.

Car 4 and car 6 will receive the "level 2" signal and do one or more of the following:

1.) Emit an audible buzzer/alarm,
2.) depress the brake pedal,
3.) retransmit the "level 2" signal as a "level 3" warning signal (which, again, may indicate the particular stage of relay hierarchy and/or an even lesser degree of proximity) to other vehicles in, for example, a twenty-five yard radius. Thus, car 7 (e.g. well beyond the range of the signal from car 1 or car 2 will detect the warning signal and take a generally lesser response such as only providing an audible warning, possibly including some collision avoidance action such as automatic braking in car 7 and suggesting acceleration in car 6.

It should be noted that the choice of actions taken in each of cars 3-7, respectively, can generally be made based upon the directionality, ranging of the received signal and/or level of the warning signal which may also indicate distance and/or the number of intervening vehicles. For example, since cars 3 and 4 are behind the collision and could potentially become involved in it (e.g. as a so-called chain reaction collision) and receive the "level 1" signal from the front (or side for car 3), some collision avoidance function such as braking or providing a steering prompt would generally be applied in both cars (possibly differentiated by the difference between response to a "level 1" and a "level 2" signal or directionality of signal reception while in cars 5 and 6, in front of the collision and receiving the "level 1" or "level 2" warning signal from the rear, may receive only an audible prompt to accelerate or to be alert for emergency vehicles and/or to avoid each other while doing so. Again, the response may be different between cars 5 and 6 based on whether a "level 1" or "level 2" signal is received and/or the ranging detected.

It should be noted that this example of a peer-to-peer warning communication system in accordance with the invention provides three levels of notification but the number of relayed levels could be fewer or extended, as desired, to cover a desired distance range (e.g. one-quarter or one-half mile, particularly to the rear of the collision) and the range and number of levels may be made variable depending on detected conditions such as speed or braking history (which may be indicative of traffic congestion). It is considered preferable to maintain information regarding the level/number of retransmissions and to possibly reflect such information in audible warnings as well as approximating distances from the crash origination but it is considered to be unnecessary to otherwise differentiate the responses beyond a certain level number (e.g. beyond "level 3" or so where only audible warnings but not collision avoidance control are likely to be of use and/or beyond level 10, warning signals should not be further propagated as warnings but only as driver information). It should also be noted that the example in FIG. 1A is not limited to a "crash" situation but could similarly apply to a "near-crash" situation such as severe braking or swerving of a single vehicle to avoid a deer, aggressive driver or the like or even dangerous driving conditions such as spillage, obstacles or so-called "tailgating" which increases the likelihood of some crash or presents a hazard.

Figure 2:
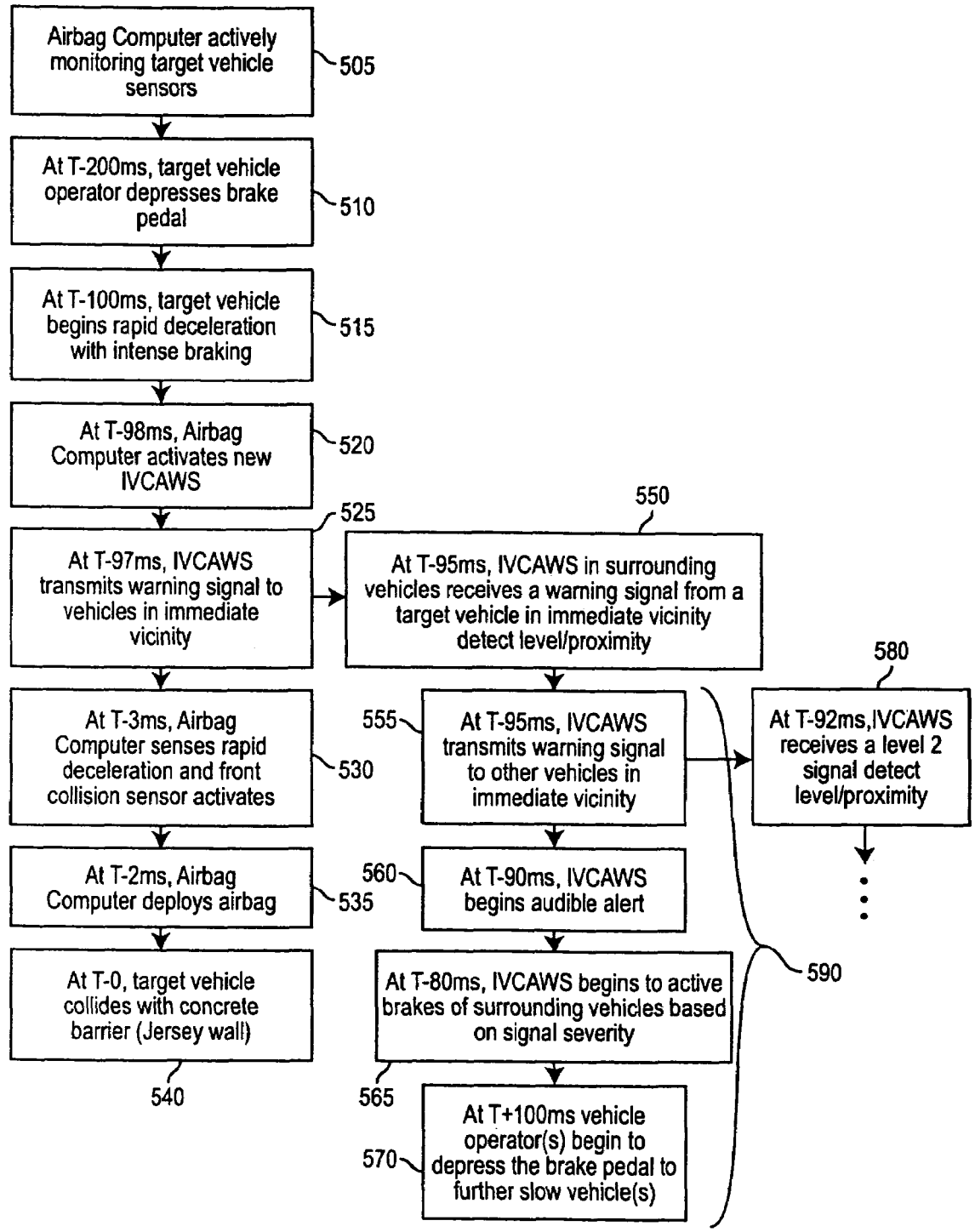
FIGS. 2 and 3 are flow charts illustrating exemplary sequences of IVCAWS operations in accordance with the invention.

The sequence and an exemplary timing of operation of the IVCAWS system in accordance with the invention is shown in FIG. 2. Beginning in a normal state at 505 with all sensor outputs within nominal values, at T−200 ms a vehicle which will be involved in an accident at time T=0 and which will be referred to as a target vehicle detects operator depression of the brake pedal as shown at 510. AS shown at 515, at T−100 ms, rapid deceleration with intense braking is detected. While a collision may be predictable at this point, deployment of the air bag would be premature but, as shown at 520, at T−98 ms, the IVCAWS in accordance with the invention is activated (e.g. above the stand-by state). Thus, at T−97 ms, the IVCAWS transmits a warning signal to vehicles in the immediate vicinity (525). The operation of the IVCAWS system in other vehicles will be discussed in greater detail below, beginning with step 550. However, it is important to note that it is possible for the invention to discriminate a problem and to begin distribution of information and control signals through a peer-to-peer wireless network within a very short period of time and typically less than half the time between initial condition detection and air bag deployment in the target vehicle. Further, it is important to understand that peer-to-peer communications in accordance with the invention are initiated and completed well before any need for air bag deployment and cannot interfere with air bag deployment and, moreover, is performed while the air bag deployment processor otherwise would be essentially in a wait state between detection of an abnormal condition and the onset of a collision (e.g. at T−2 ms) and thus communications in accordance with the invention can be executed as an intermediate action during a period when the processor is greatly underutilized and indicating that no additional processing power is required for implementing the invention. It is also important to note that the communication branches very quickly at about two to three milliseconds per distribution level which would allow warning through twenty levels or more prior to an actual crash occurrence.

Later, in the target vehicle, at T−3 ms further rapid deceleration is detected and the collision sensor is activated (530), causing the air bag to deploy at T−2 ms (535) and at T=0 the shock and deceleration from the collision impact (540) is propagated back to the passenger compartment of the vehicle where the air bag is already deployed to protect the occupants.

In surrounding vehicles, as shown at 550, the IVCAWS in surrounding vehicles receives the transmission from the target vehicle at T−95 ms and retransmits the level 1 signal received as a level 2 signal at T−95 ms, as shown at 555 to cause another level of peer-to-peer communication branching 580, 590, as before, but with a different branching level identified in the signal. An audible alert 560 is begun within a few milliseconds followed shortly thereafter by the onset of application of brakes as a collision avoidance action at, for example, T−80. Thus, collision avoidance is begun in adjacent vehicles well before the collision involving the target vehicle takes place. This action can supplement and accelerate the effects of the operator response (generally delayed by a reaction time of more than 100 ms) such that full braking may be achieved quickly (e.g. T+100 ms as shown at 570). Similar actions propagate rapidly through the wireless peer-to-peer network of surrounding vehicles in a spatially expanding manner initiating repetitions of the actions indicated by bracket 590, although the sequence may be truncated as the level number increases through multiple transmissions and increasingly remote vehicles are contacted.

Figure 3:
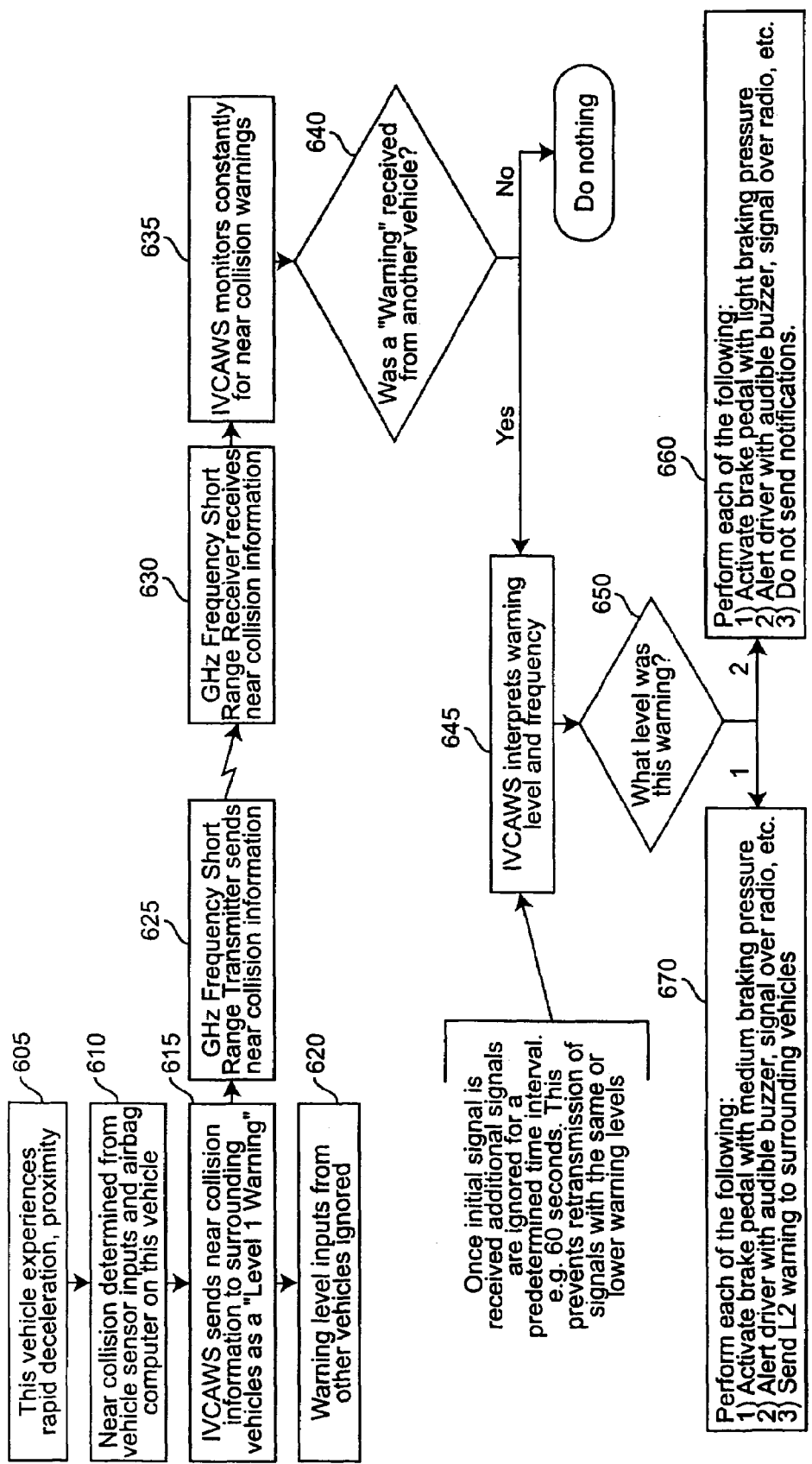

A variation of this sequence illustrating some additional perfecting features and preferred modifications for near collisions and dangerous conditions (such as tail-gating) alluded to above is shown in FIG. 3. At 605, the vehicle is continually monitoring conditions including, proximity to other vehicles as well as conditions alluded to above and experiences a rapid deceleration. A near-collision or dangerous condition is determined by suitable programming of the air bag deployment processor, details of which are unimportant to the successful practice of the invention, as shown at 610. Once such a condition is determined, a level 1 warning is sent to surrounding vehicles (615) and detection of warning signals from other vehicles is suppressed (620) for a short period of time (e.g. thirty to sixty seconds). This is done since the vehicle is the possible origination of the warning and is at greatest risk while other vehicles are necessarily more remote. Additionally, it is desirable that the response speed of the system be maintained as short as possible and it is preferable to avoid making more complex responses which consider additional transmitted peer-to-peer warning messages that are less likely to be relevant. On the other hand, it may be preferable to allow detection of a level 1 collision signal or signals above a certain level over which a current dangerous condition warning may be redundant. The particular arrangement employed in this regard is considered a perfecting feature of the basic invention and unnecessary to the successful practice thereof.

The near collision or dangerous condition information is transmitted at 625 and received by another vehicle at 630 in which the IVCAWS constantly monitors 635 for such warnings. It is preferred that the nature of the warning be communicated (e.g. "sudden braking", "close following", etc. which may be encoded as desired or transmitted on unique frequencies; WiFi and WiMax formats being generally preferred at the present time). Constant monitoring for such warnings implies a continual testing for such a received warning 640. If no warning is received, no action is taken. However, if such a warning is received, IVCAWS interprets the warning level, transmission proximity (if desired) and text, code or frequency, as before at 645. It is also considered to be desirable in view of the concerns discussed above, to provide for a suppression of detection of additional signals for a short period of time (e.g. 15 to 30 seconds or the time required for the required response) to allow a simpler and more direct response to be made to each warning, in turn, as such warnings are received since they are not originating with the vehicle receiving such signals, a slightly different rationale than that described above. Since a wide variety of conditions (including collisions) could be represented in accordance with the received message, it is particularly desirable in this variant operational sequence to alter response in accordance with the transmitted level information of the warning signal, again recalling that the level will reflect the distance from the originating vehicle, in terms of intervening cars. Assuming the signal is received from the front or the side of the vehicle (since response may be further modified or chosen in accordance therewith, as described above), if the warning is level 1 (or any other level chosen), brakes are activated with medium pressure to begin slowing the vehicle to increase distance from the problem, a buzzer or other annunciator is sounded to alert the driver and the warning is re-transmitted as level 2 or the next lower level as shown at 670. However, if the received signal is of level 2 or a lower level than that invoking operations 670, the same actions are performed except for the retransmission of the warning if the level is considered to be to remote in view of the nature of the condition reflected in the warning as shown at 660. That is, the decision to block retransmission of the warning can be performed at any of a range of levels depending on the condition and the level at which such discrimination is performed is at operation 650.

In either of the above collision or near-collision scenarios (hereinafter sometimes collectively referred to as an "event"), it is considered important but not required to differentiate between peer-to-peer signal communication directions. Such differentiation of responses is generally illustrated in FIG. 4 in which the responses encompass both of the foregoing scenarios. In this regard, it is considered preferable to separately respond to and control reception in four directions: fore, aft, left and right. However, the invention can be successfully practiced with only omnidirectional transmission and reception although practice of the invention using two directions of transmission and reception (e.g. longitudinal or parallel to vehicle movement and transverse or generally orthogonal to the direction of vehicle movement) is possible. Differentiation between fore and aft directions of reception is more important than differentiation between left and right directions of reception in order to avoid a collision avoidance response of braking as a collision avoidance response when a warning is received from behind a given vehicle. Therefore, differentiation of three directions of signal reception is also possible and preferable to any lesser number. If three directions of signal reception as chosen for implementation of the invention, it may be preferable to suppress reception from behind a vehicle and to only transmit originating or relayed warnings to the rear of a given vehicle. A minimum of four independent directions of signal reception and response is preferred since it is generally unnecessary to transmit a lower warning level signal in the direction from which a higher warning level signal has been received and response to any such transmission should generally be suppressed as with suppression of response to reflected transmissions as alluded to above.

As shown in FIG. 4, if a warning level 1 signal is received from the front of a vehicle, it is preferred to provide an in-vehicle warning, perform braking, preferably in accordance with signal strength or other parameter, and re-transmit the warning level 1 signal as a level 2 signal which may also be different for either or both lateral directions from the re-transmitted signal to at least the rear. If a warning level 1 signal is received from the left or right or aft of the vehicle, the same or a similar (e.g. also indicating the direction of reception corresponding to a collision or near-collision) in-vehicle warning signal is provided to an operator and re-transmission of the signal as a warning level 2 signal are preferably performed while braking is avoided but a steering prompt may be optionally provided, preferably in response to signal strength. If, on the other hand, a warning level 2 signal is received from the front of the vehicle, an in-vehicle warning, which may be different from the response to a warning level 1 signal, is provided together with a possibly lesser braking response and re-transmission of a reduced level and possibly generic (e.g. without a particular level) warning signal is transmitted. If a warning level 2 signal is received from another direction, an in-vehicle warning is preferably performed without collision avoidance action being taken (since braking is inappropriate and the collision or near-collision may be too remote for a steering prompt to be appropriate) and a generic warning signal is transmitted. If such a generic warning signal is received from any direction only an in-vehicle warning is provided although it may convey directional information. No collision avoidance action is taken since the vehicle is, at this peer-to-peer re-transmission level, too remote from the collision or near-collision for any such action to be appropriate. Further, at this or some arbitrarily further reduced warning level, peer-to-peer re-transmission is truncated. In general, it is considered preferable to truncated re-transmission at a lower level in the lateral directions than in the forward direction and to maintain re-transmission through a greatest number of warning levels in the aft direction.

In view of the foregoing, it is seen that the invention can be implemented to good effect with minimal hardware, basically limited to peer-to-peer communication transmitters and receivers and directional antennas and shielding with the remainder of the invention implemented in software on existing air bag deployment processors which are otherwise underutilized in current vehicles. The invention, by providing for responsiveness to hierarchical levels of peer-to-peer relaying of warning information, the nature of the warning, proximity of the transmitters and direction of reception can provide a wide variety of warnings of increased specificity to the nature of the warning and relative location of each vehicle to the originating vehicle for each vehicle receiving a peer-to-peer transmission or re-transmission. Further, while it is preferred to use short-range transmissions of warnings, the geographical extent of warnings is limited only by predetermined limits of relevance of the information or the absence of vehicles to which the information would be relevant based on remoteness to an event. Conversely, suitable reaction time for collision avoidance would be provided to other vehicles which would not receive a re-transmitted warning due to a large distance between vehicles.

While the invention has been described in terms of a single preferred embodiment and variations thereon, those skilled in the art will recognize that the invention can be practiced with modification within the spirit and scope of the appended claims.

Having thus described our invention, what we claim as new and desire to secure by Letters Patent is as follows:

1. An in-vehicle collision and warning system (IVCAWS) for a vehicle comprising:
    a vehicle air bag collision protection system including sensors and a processor, said processor being capable of discriminating a collision, near-collision or dangerous condition;
    means for transmitting a warning or information signal upon detection of said collision, near-collision or dangerous condition; and
    means responsive to a received warning or information signal for
        providing a warning to an operator of the vehicle,
        selectively relaying the warning or information signal directionally, and
        selectively controlling the vehicle for collision avoidance.

2. An IVCAWS system as recited in claim 1, wherein said means responsive to said received warning or information signal further comprises:
    means for transmitting warning level information indicating a number of time the warning or information signal has been relayed.

3. An IVCAWS system as recited in claim 1, wherein said means responsive to a received warning or information signal is responsive to a direction of reception of said received warning or information signal.

4. An IVCAWS system as recited in claim 3, wherein said warning to an operator is responsive to said direction of reception of said warning signal.

5. An IVCAWS system as recited in claim 3, wherein said relaying of a warning signal is responsive to said direction of reception of said warning signal.

6. An IVCAWS system as recited in claim 3, wherein said controlling of said vehicle is responsive to said direction of reception of said warning signal.

7. An IVCAWS system as recited in claim 2, wherein said means responsive to a received warning or information signal is responsive to a direction of reception of said received warning or information signal.

8. An IVCAWS system as recited in claim 7, wherein said warning to an operator is responsive to said direction of reception of said warning or information signal.

9. An IVCAWS system as recited in claim 7, wherein said relaying of a warning signal is responsive to said direction of reception of said warning or information signal.

10. An IVCAWS system as recited in claim 7, wherein said controlling of said vehicle is responsive to said direction of reception of said warning or information signal.

11. A method of in-vehicle collision avoidance and warning comprising steps of:
   predicting an event in an originating vehicle using an air bag deployment processor;
   transmitting a warning signal to another vehicle;
   directionally receiving said warning signal at said another vehicle; and selectively and directionally relaying said warning signal at a different warning level to other vehicles responsive to a direction of reception of said directionally receiving step.

12. A method as recited in claim 11, comprising a further step of:
   performing a collision avoidance action in response to one of a signal reception parameter and a signal reception direction.

13. A method as recited in claim 11, comprising a further step of:
   providing an in-vehicle warning signal in said another vehicle.

14. A method as recited in claim 11, comprising a further step of
   truncating said relaying step at a predetermined warning level.

15. A method as recited in claim 14, wherein said truncating step is selectively responsive to reception direction.

* * * * *